United States Patent
Shveidel et al.

(10) Patent No.: US 11,151,056 B2
(45) Date of Patent: Oct. 19, 2021

(54) EFFICIENT VIRTUALIZATION LAYER STRUCTURE FOR A DATA STORAGE SYSTEM

(71) Applicant: EMC IP Holding Company LLC, Hopkinton, MA (US)

(72) Inventors: Vladimir Shveidel, Pardes-Hana (IL); Uri Shabi, Tel Mond (IL); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 278 days.

(21) Appl. No.: 16/394,632

(22) Filed: Apr. 25, 2019

(65) Prior Publication Data

US 2020/0341907 A1 Oct. 29, 2020

(51) Int. Cl.
*G06F 12/109* (2016.01)

(52) U.S. Cl.
CPC .... *G06F 12/109* (2013.01); *G06F 2212/1044* (2013.01); *G06F 2212/657* (2013.01)

(58) Field of Classification Search
CPC ............. G06F 12/109; G06F 2212/657; G06F 2212/1044
See application file for complete search history.

(56) References Cited

U.S. PATENT DOCUMENTS

| | | | | |
|---|---|---|---|---|
| 7,237,062 | B2* | 6/2007 | Lubbers | G06F 3/0619 711/114 |
| 7,254,754 | B2* | 8/2007 | Hetzler | G06F 11/1076 714/6.2 |
| 7,603,529 | B1* | 10/2009 | MacHardy | G06F 3/0608 707/999.202 |
| 8,032,498 | B1 | 10/2011 | Armangau et al. | |
| 8,190,850 | B1 | 5/2012 | Davenport et al. | |
| 8,412,688 | B1 | 4/2013 | Armangau et al. | |
| 8,578,128 | B1 | 11/2013 | Davenport et al. | |
| 9,569,356 | B1 | 2/2017 | Wei et al. | |
| 2008/0209253 | A1* | 8/2008 | Sheppard | G06F 11/1096 714/1 |

* cited by examiner

*Primary Examiner* — Kalpit Parikh
(74) *Attorney, Agent, or Firm* — BainwoodHuang (57) ABSTRACT

Techniques for providing an efficient virtualization layer structure in a data storage system. The techniques include implementing multiple layers of indirection for accessing host data in the data storage system, including a mapping layer, a virtualization layer, and a physical layer. The virtualization layer includes virtual layer blocks (VLBs), each VLB including virtual pointers. Each virtual pointer is pointed to by one or more leaf pointers in the mapping layer, and points to a data block in the physical layer. The techniques include generating, for each virtual pointer in the VLB, reference count metadata to keep track of the number of leaf pointers pointing to the virtual pointer, and maintaining, in a metadata page, the reference count metadata for the virtual pointers in a three (3)-way mirror. The techniques include maintaining each VLB of the virtualization layer in a RAID stripe across multiple physical drives in the data storage system.

18 Claims, 6 Drawing Sheets

| Reference count array 302 | | | | |
|---|---|---|---|---|
| Logical index 0 | Reference count 304.0 (e.g., "2" for VP 144.0 (Fig. 1f)) | Reference count 304.1 (e.g., "1" for VP 144.1 (Fig. 1f)) | ••• | Reference count 304.u (e.g., "1" for VP 144.u (Fig. 1f)) |
| Logical Index 1 | Reference count 306.0 | Reference count 306.1 | ••• | ••• |
| ••• | | | | |
| Logical Index p | Reference count 308.0 | Reference count 308.1 | ••• | ••• |

EFFICIENT VIRTUALIZATION LAYER STRUCTURE FOR A DATA STORAGE SYSTEM

BACKGROUND

Data storage systems include storage processors coupled to arrays of physical non-volatile storage devices (also referred to herein as "physical drives"), such as magnetic disk drives, electronic flash drives, and/or optical drives. The storage processors are configured to service storage input/output (IO) requests received from host computers, which typically send the storage IO requests (e.g., write requests, read requests) to the data storage systems over one or more networks. The storage IO requests specify data pages, data blocks, data files, and/or any other suitable data elements (also referred to herein as "host data") to be written to, read from, created on, and/or deleted from data volumes, logical units (LUNs), file systems, and/or any other suitable storage objects on the physical drives. Computer software application programs running on the storage processors are configured to manage the received storage IO requests, and to perform various data processing tasks to organize and/or secure the host data and/or storage objects on the physical drives.

SUMMARY

Data storage systems employ various logical structures in memory for organizing host data, including logical structures such as a namespace, a mapper, virtual layer blocks (VLBs), and physical layer blocks (PLBs). A namespace is configured to organize storage objects such as LUNs and file systems, and to track logical addresses of the storage objects such as address offsets into LUNs, file system addresses, and so on. A mapper is configured to map the logical addresses of the storage objects in the namespace to virtualization structures (also referred to herein as "virtual pointers") in the respective VLBs. For example, such a mapper may include multiple pointer arrays in a mapping hierarchy configured as a multi-level tree. Further, the lowest level of the multi-level tree may include an array of leaf pointers, each pointing to one of multiple virtual pointers in a respective VLB. Each such virtual pointer in the respective VLB is configured to point to data, such as a data block, in a respective PLB.

Some data storage systems support data deduplication to increase storage efficiency. Such data storage systems perform data deduplication by replacing any redundant data with pointers that point to a single retained copy (or a reduced number of retained copies) of the redundant data. Each such data storage system typically maintains a database configured to associate digests (e.g., hash values) of stored data blocks with corresponding metadata for pointers to locations of the stored data blocks within the data storage system. Upon receipt of a write request for writing a data block to a storage object (e.g., a LUN), the data storage system computes a digest of the data block, and attempts to match the computed digest with one of the digests stored in the database. If a matching digest is found, then the data storage system configures pointer metadata (e.g., metadata for a leaf pointer, metadata for a virtual pointer) for the data block to point to a stored data block in a PLB that is also pointed to by the pointer metadata associated with the matching digest. Further, the data storage system typically maintains reference count metadata in each virtual pointer to keep track of the number of leaf pointers that point to the virtual pointer as a result of data deduplication.

Data storage systems employ various techniques to assure high availability in the event of system failures. For example, such a system failure may correspond to the failure of one or more physical drives of a data storage system. To protect against possible data and/or metadata loss due to a physical drive failure, the data storage system can be configured such that at least some its physical drives belong to a redundant array of independent (or inexpensive) disks (RAID) group, which is a storage device array created by logically binding a set of physical drives together. Such a RAID group can represent a logically contiguous address space distributed across a set of physical drives. Further, different RAID levels can be employed to provide varying degrees of fault tolerance for physical drive failures within the RAID group. For example, a RAID-6 level group may protect against data and/or metadata loss due to the concurrent failure of two (2) physical drives. It is noted that the terms "storage device(s)", "drive(s)", and "disk(s)" are employed herein interchangeably, even though it is well known that not all physical storage devices or drives include rotating disks.

Unfortunately, assuring high availability can be problematic for data storage systems that support data deduplication. As described herein, such data storage systems typically maintain reference count metadata in virtual pointers to keep track of the number of leaf pointers that point to the respective virtual pointers as a result of data deduplication. To provide RAID-6 level protection against the loss of such metadata, VLB objects can be stored in RAID-6 stripes at fixed address locations, allowing the metadata to be written or updated "in-place" on physical drives of a data storage system. Further, a technique referred to herein as "journaling" can be employed, in which information entries pertaining to any updates of the in-place metadata are maintained in a log or "journal" in backup storage. In a recovery processing flow, the information entries maintained in the journal can be used to effectively rollback the backup storage to a previous point-in-time (PIT). However, such journaling generally involves significant processing overhead, requiring several data transactions at a backup storage site for each data transaction at a production site.

To avoid the processing overhead of journaling while still providing RAID-6 level protection, a technique referred to herein as "address translation" can be employed. In this case, VLB objects can be stored in RAID-6 stripes at virtual address locations, and a translation table can be used to provide a mapping between the virtual address locations and physical address locations on physical drives. Further, certain physical address locations can correspond to actual locations on the physical drives where metadata (e.g., reference count metadata) are stored, while corresponding virtual address locations can appear, from the perspective of a host computer, to be the actual locations of the metadata on the physical drives. However, providing RAID-6 level protection with address translation can lead to write amplification, due to the need to repeatedly update the translation table. Moreover, whether such journaling or address translation techniques are employed, each update of metadata in a RAID-6 stripe requires the entire RAID-6 stripe to be read, modified, and written, due to the need to calculate and store parity information in the RAID-6 stripe.

Another technique that provides a degree of fault tolerance commensurate with RAID-6 level protection (i.e., protection against metadata and/or data loss due to the concurrent failure of two (2) physical drives) involves a mirror configuration referred to herein as a three (3)-way mirror. Such a 3-way mirror can be configured to include at least a primary drive, a secondary drive, and a tertiary drive. Further, VLB objects can be written or updated in-place on the primary, secondary, and the tertiary drives such that each respective drive has a mirrored copy of the same VLB object. However, storing three (3) copies of each VLB object on the primary, secondary, and tertiary drives of the 3-way mirror wastes capacity of a data storage system. Moreover, having to perform three (3) write operations for each update of in-place metadata on the 3-way mirror can also lead to metadata write amplification, which can reduce throughput, increase latency, and/or increase wear on the physical drives used to store the metadata.

Techniques are disclosed herein for providing an efficient virtualization layer structure in a highly available data storage system. The disclosed techniques can include implementing multiple layers of indirection for accessing host data in the data storage system, including at least a mapping layer, a virtualization layer, and a physical layer. The virtualization layer can include an aggregation of virtual layer blocks (VLBs), and each VLB can include a plurality of virtual pointers. Each virtual pointer in the VLB can be pointed to by one or more leaf pointers in the mapping layer and can point to a data block in the physical layer. The disclosed techniques can further include generating, for each virtual pointer in the VLB, reference count metadata to keep track of the number of leaf pointers pointing to the virtual pointer, and maintaining, in one or more metadata pages, the reference count metadata for the respective virtual pointers in a 3-way mirror. The disclosed techniques can still further include maintaining each entire VLB of the virtualization layer in a RAID stripe across multiple physical drives of the data storage system.

In the disclosed techniques, the reference count metadata for the virtual pointers in the VLBs can be maintained in the 3-way mirror in multiple metadata pages, each of which can include many (e.g., up to several thousand or more) reference counts, allowing potentially many reference counts to be updated in a single metadata update operation. In addition, because, in the disclosed techniques, the reference count metadata are maintained in a 3-way mirror configuration that is separate from the VLBs of the virtualization layer, each entire VLB can be maintained in a respective RAID stripe without requiring the journaling of updates to the reference counts.

In certain embodiments, a method of providing metadata protection in a data storage system includes implementing multiple layers of indirection for accessing host data in the data storage system, in which the multiple layers of indirection include at least a mapping layer and a virtualization layer. The method further includes generating, for one or more virtual pointers in one or more virtual layer blocks (VLBs) of the virtualization layer, reference count metadata to keep track of a number of leaf pointers in the mapping layer pointing to each virtual pointer, maintaining the reference count metadata for each virtual pointer in at least one metadata page on an N-way mirror RAID of the data storage system, and maintaining each entire VLB of the virtualization layer in a respective RAID stripe among multiple RAID stripes of a RAID tier of the data storage system.

In certain arrangements, the method further includes mapping, by the mapping layer, one or more logical addresses of one or more logical units to the one or more virtual pointers in the one or more VLBs, and maintaining, in each virtual pointer, a digest of data corresponding to a respective logical address mapped to the virtual pointer.

In certain arrangements, the multiple layers of indirection further include a physical layer, and the method further includes maintaining, in each virtual pointer, tracking metadata for addressing a data block in a physical layer block (PLB) of the physical layer.

In certain arrangements, the N-way mirror RAID is a 3-way mirror RAID, the 3-way mirror RAID includes at least a primary drive, a secondary drive, and a tertiary drive of the data storage system, and the maintaining of the reference count metadata for each virtual pointer in the at least one metadata page includes (i) storing a first instance of each metadata page in-place on the primary drive, (ii) storing a second instance of each metadata page in-place on the secondary drive, and (iii) storing a third instance of each metadata page in-place on the tertiary drive.

In certain arrangements, the reference count metadata includes a reference count corresponding to the number of leaf pointers pointing to a respective virtual pointer, each VLB has a logical index associated therewith, and the maintaining of the reference count metadata for each virtual pointer in the at least one metadata page further includes maintaining, in a respective metadata page for the logical index of the VLB, the reference count corresponding to the number of leaf pointers pointing to each respective virtual pointer in the VLB.

In certain arrangements, the maintaining of each entire VLB of the virtualization layer in a respective RAID stripe includes maintaining each entire VLB of the virtualization layer in a respective RAID stripe of a RAID-6 tier of the data storage system.

In certain arrangements, the maintaining of each entire VLB of the virtualization layer in a respective RAID stripe includes maintaining each entire VLB of the virtualization layer in the respective RAID stripe of a 6+2 RAID-6 tier of the data storage system.

In certain arrangements, the data storage system includes a plurality of physical drives, and the maintaining of each entire VLB of the virtualization layer in a respective RAID stripe includes maintaining each entire VLB of the virtualization layer in a respective RAID stripe at a fixed location across at least some of the plurality of physical drives.

In certain embodiments, a system for providing metadata protection in a data storage system includes a memory, and storage processing circuitry configured to execute program instructions out of the memory to implement multiple layers of indirection for accessing host data in the data storage system, in which the multiple layers of indirection include at least a mapping layer and a virtualization layer. The storage processing circuitry is further configured to execute the program instructions out of the memory to generate, for one or more virtual pointers in one or more virtual layer blocks (VLBs) of the virtualization layer, reference count metadata to keep track of a number of leaf pointers in the mapping layer pointing to each virtual pointer, to maintain the reference count metadata for each virtual pointer in at least one metadata page on an N-way mirror RAID of the data storage system, and to maintain each entire VLB of the virtualization layer in a respective RAID stripe among multiple RAID stripes of a RAID tier of the data storage system.

Other functions and aspects of the claimed features of this disclosure will be evident from the Detailed Description that follows.

BRIEF DESCRIPTION OF THE DRAWINGS

The foregoing and other objects, features, and advantages will be apparent from the following description of particular embodiments of the disclosure, as illustrated in the accompanying drawings, in which like reference characters refer to the same parts throughout the different views.

FIG. 1b is a block diagram of an exemplary data storage appliance included in the clustered storage environment of FIG. 1a;

FIG. 3b is a diagram of an exemplary reference count array for use with the 3-way mirror RAID of FIG. 3a.

DETAILED DESCRIPTION

Techniques are disclosed herein for providing an efficient virtualization layer structure in a highly available data storage system. The disclosed techniques can include implementing multiple layers of indirection for accessing host data in the data storage system, including at least a mapping layer, a virtualization layer, and a physical layer. The virtualization layer can include an aggregation of virtual layer blocks (VLBs), in which each VLB includes a plurality of virtual pointers. Each virtual pointer in the VLB can be pointed to by one or more leaf pointers in the mapping layer, and can point to a data block in the physical layer. The disclosed techniques can further include generating, for each virtual pointer in the VLB, reference count metadata to keep track of the number of leaf pointers pointing to the virtual pointer, and maintaining, in one or more metadata pages, the reference count metadata for the respective virtual pointers in a three (3)-way mirror. The disclosed techniques can still further include maintaining each entire VLB of the virtualization layer in a redundant array of independent (or inexpensive) disks (RAID) stripe across at least some of the physical drives of the data storage system.

Figure 1A:
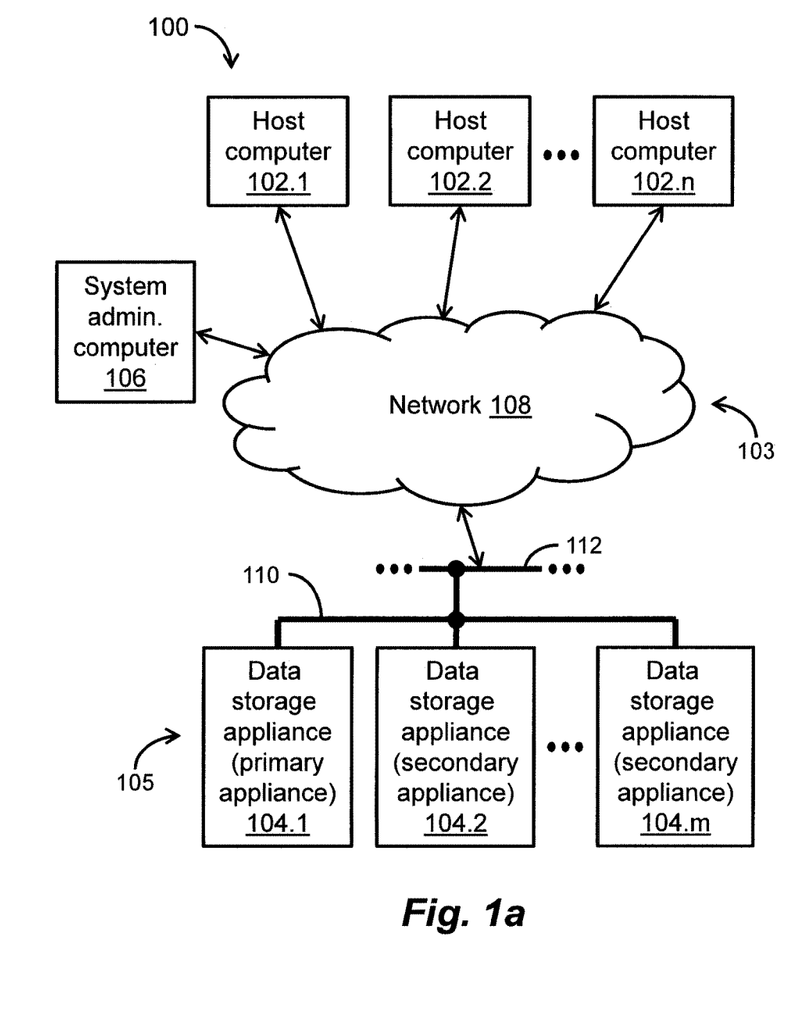
FIG. 1a is a block diagram of an exemplary clustered storage environment, in which techniques can be practiced for providing an efficient virtualization layer structure in a highly available data storage system.

FIG. 1a depicts an illustrative embodiment of an exemplary clustered storage environment 100, in which techniques can be practiced for providing an efficient virtualization layer structure in a highly available data storage system. As shown in FIG. 1a, the clustered storage environment 100 can include a plurality of host computers 102.1, 102.2, . . . , 102.n, at least one storage domain 105, and a system administrator computer 106, which are interconnected by a communications medium 103 that includes at least one network 108. For example, each of the plurality of host computers 102.1, . . . , 102.n may be configured as a web server computer, a file server computer, an email server computer, an enterprise server computer, or any other suitable client or server computer or computerized device. Further, the system administrator computer 106 may be remote from (or local to) the storage domain 105 within the clustered storage environment 100.

As further shown in FIG. 1a, the storage domain 105 can include, as members of the storage domain 105, a plurality of data storage appliances 104.1, 104.2, . . . , 104.m. In the storage domain 105, the data storage appliance 104.1 can be elected or otherwise designated to perform (at least temporarily) a role of a primary storage appliance, while each of the remaining data storage appliances 104.2, . . . , 104.m perform (at least temporarily) a role of a secondary storage appliance. The storage domain 105 can further include a local area network (LAN) 110 such as an Ethernet network or any other suitable network, which is configured to interconnect the plurality of data storage appliances 104.1, . . . , 104.m. A plurality of LANs (like the LAN 110) included in a plurality of storage domains (like the storage domain 105) can be interconnected by a network 112, such as a metropolitan area network (MAN), a wide area network (WAN), or any other suitable network.

Within the clustered storage environment 100 of FIG. 1a, the system administrator computer 106 can be configured to execute program instructions to enable a system administrator or other user to define and/or configure the storage domain 105. Further, the plurality of host computers 102.1, . . . , 102.n can be configured to provide, over the network 108, storage input/output (IO) requests (e.g., small computer system interface (SCSI) commands, network file system (NFS) commands) to the respective storage appliances (primary or secondary) 104.1, . . . , 104.m of the storage domain 105. For example, such storage IO requests (e.g., write requests, read requests) may direct the respective storage appliances (primary or secondary) 104.1, . . . , 104.m to write and/or read data pages, data blocks, data files, and/or any other suitable data elements to/from data volumes (e.g., virtual volumes (VVOLs)), logical units (LUNs), file systems, and/or any other suitable storage objects stored in association with the respective storage appliances 104.1, . . . , 104.m.

The communications medium 103 can be configured to interconnect the plurality of host computers 102.1, . . . , 102.n with the respective storage appliances 104.1, . . . , 104.m of the storage domain 105 to enable them to communicate and exchange data and/or control signaling. As shown in FIG. 1a, the communications medium 103 is illustrated as a "cloud" to represent a variety of different communications topologies such as a backbone topology, a hub-and-spoke topology, a loop topology, an irregular topology, or any suitable combination thereof. As such, the communications medium 103 can include copper-based data communications devices and cabling, fiber optic devices and cabling, wireless devices, or any suitable combination thereof.

Further, the communications medium 103 can be configured to support storage area network (SAN)-based communications, network attached storage (NAS)-based communications, LAN-based communications, MAN-based communications, WAN-based communications, wireless communications, distributed infrastructure communications, and/or any other suitable wired, wireless, or fiber communications.

Figure 1B:
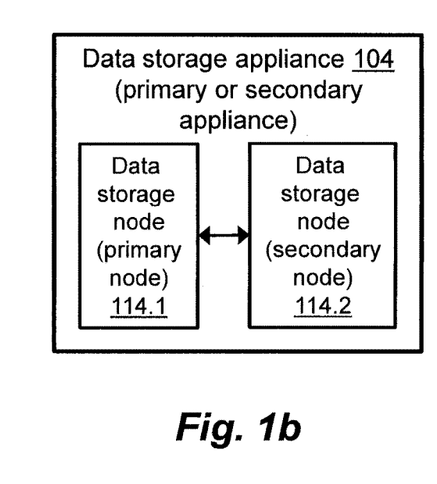

FIG. 1b depicts an exemplary data storage appliance 104 included in the storage domain 105 of FIG. 1a. It is noted that each of the data storage appliances (primary or secondary) 104.1, . . . , 104.m included in the storage domain 105 can be configured like the data storage appliance 104 of FIG. 1b. As shown in FIG. 1b, the data storage appliance 104 can include two data storage nodes 114.1, 114.2 for providing high availability within the clustered storage environment 100. In the data storage appliance 104, the data storage node 114.1 can be elected or otherwise designated to perform (at least temporarily) a role of a primary storage node, while the data storage node 114.2 performs (at least temporarily) a role of a secondary storage node. For example, the data storage node (primary) 114.1 may (i) receive storage IO requests (e.g., write requests, read requests) from one or more of the host computers 102.1, . . . , 102.n over the network 108, (ii) in response to the storage IO requests, write and/or read data pages, data blocks, data files, and/or any other suitable data elements to/from one or more VVOLs, LUNs, file systems, and/or any other suitable storage objects stored in association with the data storage node (primary) 114.1, and (iii) at least at certain time intervals, synchronize data stored in association with the data storage node (primary) 114.1 with corresponding data stored in association with the data storage node (secondary) 114.2. In the event of a failure of the data storage node (primary) 114.1, the data storage node (secondary) 114.2 can assume the role of the primary storage node, providing high availability within the clustered storage environment 100.

Figure 1C:
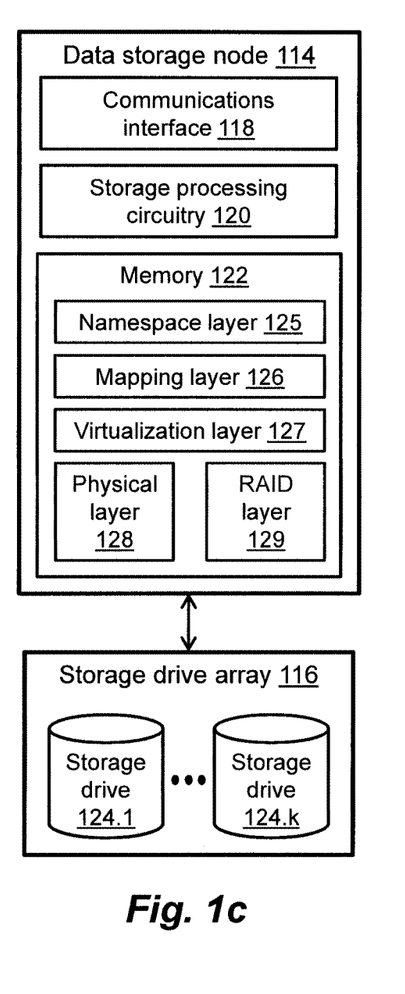
FIG. 1c is a block diagram of an exemplary data storage node included in the data storage appliance of FIG. 1b, as well as an exemplary storage drive array.

FIG. 1c depicts an exemplary data storage node 114 included in the data storage appliance 104 of FIG. 1b. It is noted that each of the data storage nodes (primary and secondary) 114.1, 114.2 of FIG. 1b can be configured like the data storage node 114 of FIG. 1c. As shown in FIG. 1c, the data storage node 114 can include a communications interface 118, storage processing circuitry 120, and a memory 122. The communications interface 118 can include SCSI target adapters, network interface adapters, and/or any other suitable adapters for converting electronic, wireless, and/or optical signals received over the network 108 to a form suitable for use by the storage processing circuitry 120. The memory 122 can include persistent memory (e.g., flash memory, magnetic memory) and non-persistent memory (e.g., dynamic random access memory (DRAM), static random access memory (SRAM)), and can accommodate a variety of specialized software constructs, including, but not limited to, a namespace layer 125, a mapping layer 126, a virtualization layer 127, a physical layer 128, a RAID layer 129, and/or any other suitable software constructs.

The namespace layer 125 is a logical structure configured to organize storage objects such as VVOLs, LUNs, file systems, and/or any other suitable storage objects, accessible to the plurality of host computers 102.1, . . . , 102.n. The namespace layer 125 can track logical addresses of storage objects, such as offsets into LUNs or file system addresses. For example, if a LUN made up of one or more extents were to have a maximum size of 10 gigabytes (Gb), then the namespace layer 125 may provide a 10 Gb logical address range to accommodate the LUN.

The mapping layer 126 is a logical structure configured to map the logical addresses of the storage objects in the namespace layer 125 to virtualization structures (also referred to herein as "virtual pointers") in the virtualization layer 127. To that end, the mapping layer 126 can include multiple pointer arrays (e.g., indirect pointer arrays) in a mapping hierarchy configured as a multi-level tree. For example, such a pointer array may include a pointer to a child pointer array, and may be pointed to by a pointer in a parent pointer array.

The virtualization layer 127 is a logical structure configured to provide block virtualization for purposes of supporting data deduplication. For example, the virtualization layer 127 may have an aggregation of virtual layer blocks (VLBs), each of which may include a plurality of virtual pointers (e.g., 512 virtual pointers). Further, the lowest level of the multi-level tree in the mapping layer 126 may include an array of leaf pointers, each of which may point to one of the virtual pointers included in a respective VLB of the virtualization layer 127. The physical layer 128 is configured to store an aggregation of physical layer blocks (PLBs). For example, such a PLB may include an aggregation of compressed data blocks, individually compressed data blocks, and/or uncompressed data blocks. Further, each virtual pointer included in a respective VLB of the virtualization layer 127 may point to a data block in a respective PLB of the physical layer 128. It is noted that, although the physical layer 128 is described herein using the term "physical", an underlying storage drive array 116 is typically responsible for the actual, physical storage of host data. The storage drive array 116 can include a plurality of storage drives 124.1, 124.2, . . . , 124.k (also referred to herein as the "physical drives"), such as magnetic disk drives, electronic flash drives, optical drives, and/or any other suitable physical drives. The storage drive array 116 can be locally attached to an IO channel of the data storage node 114, while also being accessible over the network 108. In one embodiment, the storage drive array 116 can be implemented as a dual-ported drive, which can be shared between the data storage node (primary) 114.1 and the data storage node (secondary) 114.2 of the data storage appliance 104.

The RAID layer 129 is configured to organize the physical drives 124.1, . . . , 124.k of the storage drive array 116 as one or more RAID groups, in which data can be written as RAID stripes across at least some of the physical drives 124.1, . . . , 124.k. Such RAID stripes can include redundant information, i.e., parity information with respect to the striped data, across multiple physical drives organized in a respective RAID group. For example, the RAID layer 129 may provide functionalities compatible with RAID-6 specification, which provides protection against data and/or metadata loss due to the concurrent failure of two (2) physical drives.

The storage processing circuitry 120 can include one or more physical storage processors or engines (e.g., running specialized software), data movers, director boards, blades, IO modules, storage drive controllers, switches, and/or any other suitable computer hardware or combination thereof. For example, the storage processing circuitry 120 may process storage IO requests (e.g., write requests, read requests) provided by the respective host computers 102.1, . . . , 102.n over the network 108, and store host data in a RAID environment implemented by the storage drive array 116.

In the context of the storage processing circuitry 120 being implemented using one or more processors running specialized software, a computer program product can be configured to deliver all or a portion of the software constructs to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. The non-transient computer-readable storage media can be encoded with sets of instructions that, when executed by the respective processor(s), perform the techniques disclosed herein.

Figure 1D:
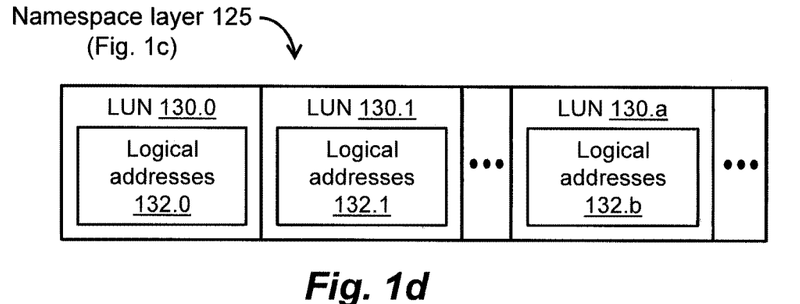
FIG. 1d is a block diagram of an exemplary namespace layer implemented in the data storage node of FIG. 1c.
Figure 1E:
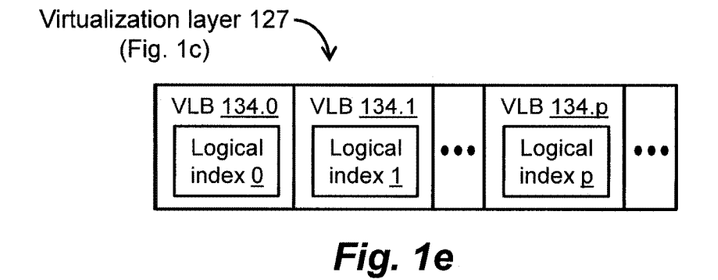
FIG. 1e is a block diagram of an exemplary virtualization layer implemented in the data storage node of FIG. 1c.
Figure 1F:
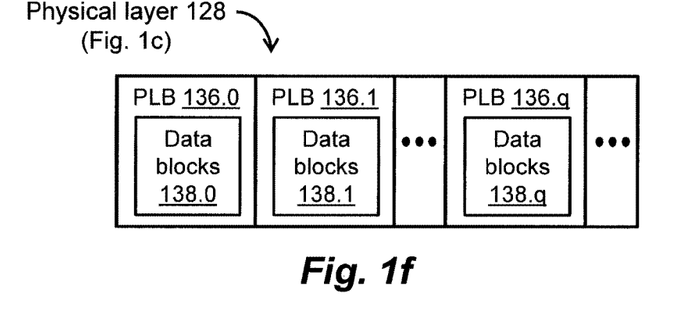
FIG. 1f is a block diagram of an exemplary physical layer implemented in the data storage node of FIG. 1c.

FIGS. 1d, 1e, and 1f depict the namespace layer 125, the virtualization layer 127, and the physical layer 128, respectively, implemented in the data storage node 114 of FIG. 1c. As shown in FIG. 1d, the namespace layer 125 can be configured to organize a plurality of LUNs, such as a LUN 130.0, a LUN 130.1, and so on, up to at least a LUN 130.a. The namespace 125 can track logical addresses of the respective LUNs 130.0, 130.1, . . . , 130.a, . . . , such as logical addresses 132.0 for the LUN 130.0, logical addresses 132.1 for the LUN 130.1, and so on, up to at least logical addresses 132.b for the LUN 130.a.

As shown in FIG. 1e, the virtualization layer 127 can be configured to include an aggregation of VLBs, such as a VLB 134.0, a VLB 134.1, and so on, up to at least a VLB 134.p. Each of the VLBs 134.0, 134.1, . . . , 134.p, . . . has an associated logical index, such as a logical index "0" for the VLB 134.0, a logical index "1" for the VLB 134.1, and so on, up to at least a logical index "p" for the VLB 134.p.

As shown in FIG. 1f, the physical layer 128 can be configured to store an aggregation of PLBs, such as a PLB 136.0, a PLB 136.1, and so on, up to at least a PLB 136.q. Each of the PLBs 136.0, 136.1, . . . , 136.q, . . . can include one or more data blocks, such as data blocks 138.0 included in the PLB 136.0, data blocks 138.1 included in the PLB 136.1, and so on, up to at least data blocks 138.q included in the PLB 136.q.

During operation, the data storage node 114 can provide metadata (and/or data) protection in the clustered storage environment 100, while reducing both storage utilization and write amplification in the physical drives 124.1, . . . 124.k of the storage drive array 116. To that end, multiple layers of indirection for accessing host data can be implemented in the data storage node 114, including at least the mapping layer 126, the virtualization layer 127, and the physical layer 128. As described herein, the virtualization layer 127 can include an aggregation of VLBs (e.g., VLBs 134.0, 134.1, . . . , 134.p, . . . ; see FIG. 1e), and each VLB can include a plurality of virtual pointers. Each virtual pointer in a respective VLB can be pointed to by one or more leaf pointers in the mapping layer 126, and can point to a data block in the physical layer 128. The data storage node 114 can generate, for each virtual pointer in a respective VLB, reference count metadata to keep track of the number of leaf pointers pointing to the virtual pointer. In addition, the data storage node 114 can maintain each entire VLB of the virtualization layer 127 in a respective RAID stripe of a RAID-6 tier 200 (see FIG. 2) across at least some of the physical drives 124.1, . . . 124.k, as well as maintain, in one or more metadata pages, the reference count metadata for the respective virtual pointers in an N-way mirror RAID, in which "N" corresponds to any suitable number of different and distinct physical drives of the storage drive array 116. In one embodiment, the N-way mirror RAID can be configured as a three (3)-way mirror RAID 300 (see FIG. 3a).

Figure 3A:
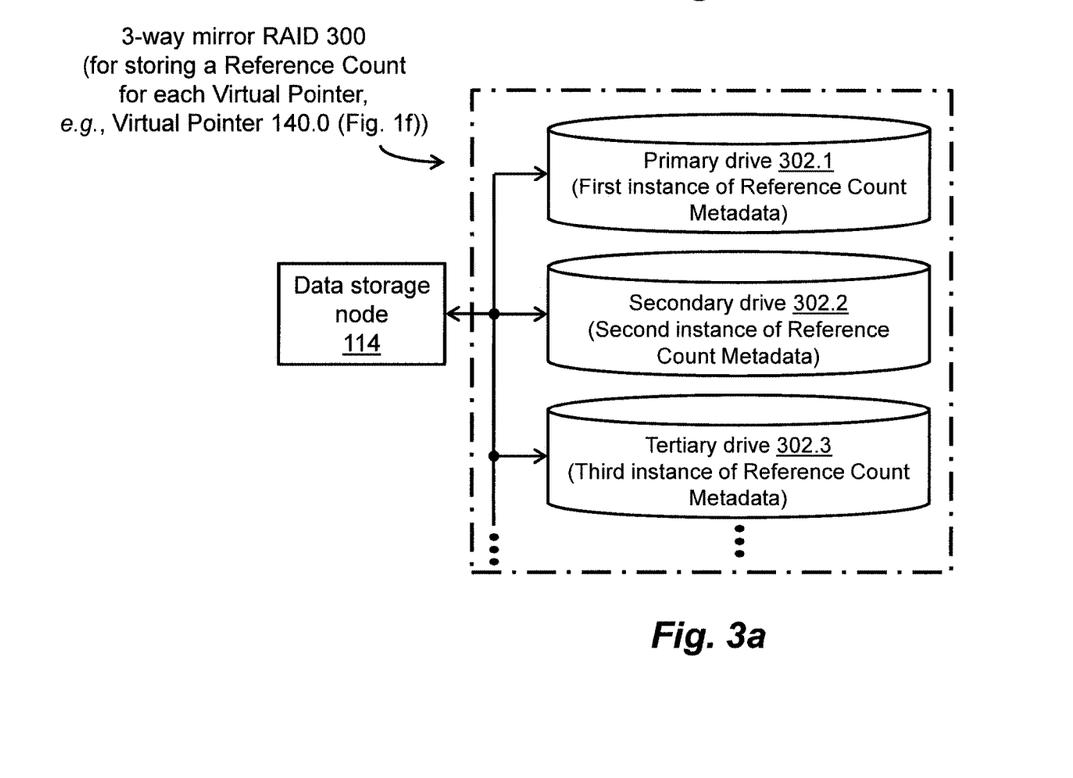
FIG. 3a is a block diagram of an exemplary three (3)-way mirror RAID for storing reference count metadata for each virtual pointer included in each VLB of the virtualization layer of FIG. 1e.

As described below with reference to an illustrative example, the reference count metadata for respective virtual pointers in the VLBs of the virtualization layer 127 can be maintained in the 3-way mirror RAID 300 in one or more metadata pages. Each such metadata page can include many (e.g., up to several thousand or more) reference counts, allowing potentially many reference counts to be written (or updated) in a single metadata write (or update) operation. In addition, because the reference count metadata are maintained in the 3-way mirror RAID 300 in a manner that is separate from the VLBs, each entire VLB can be maintained in a respective RAID stripe without requiring the journaling of updates to the reference counts.

Figure 1G:
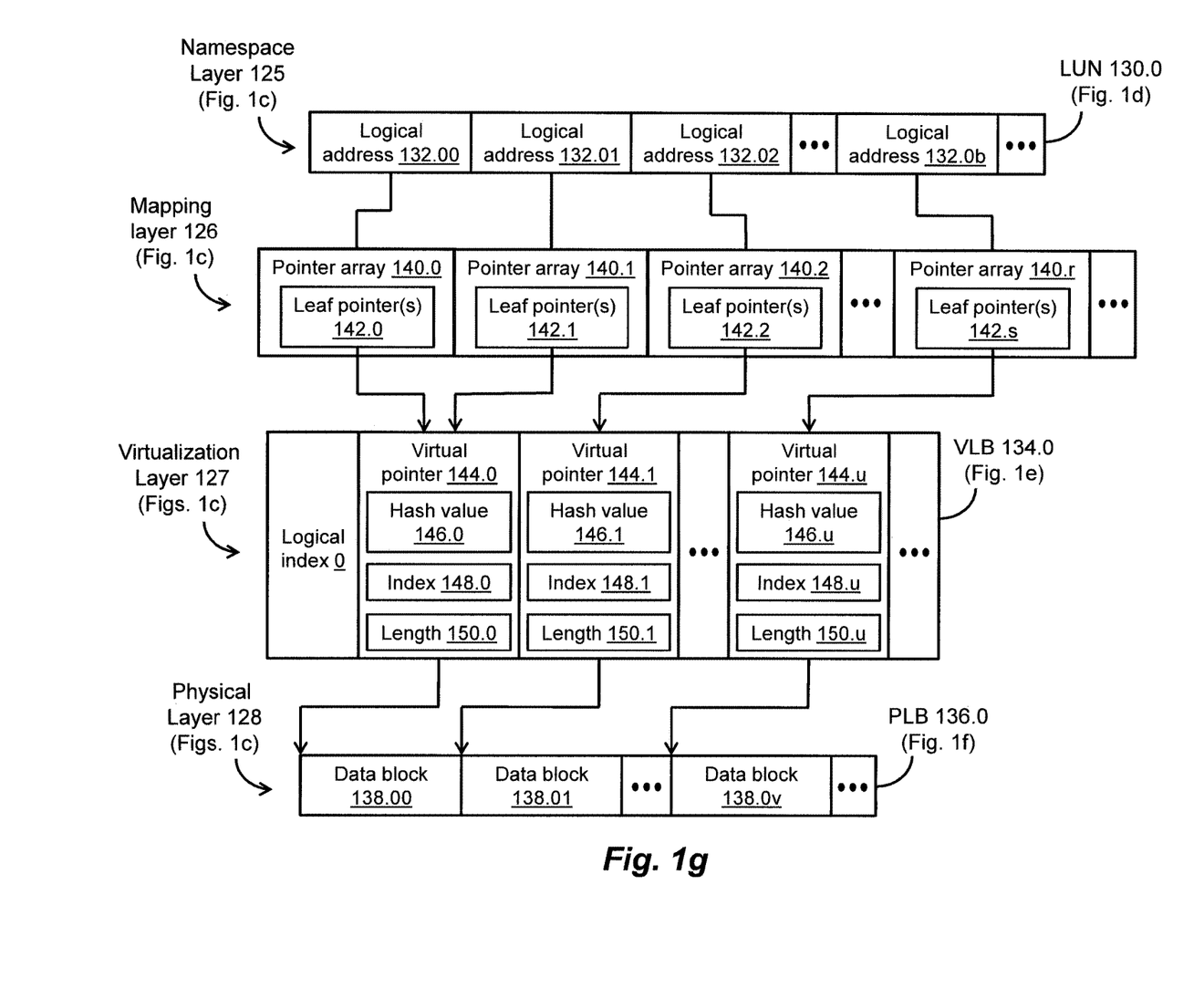
FIG. 1g is a block diagram of the namespace layer of FIG. 1d, as well as multiple exemplary layers of indirection for accessing host data in the data storage node of FIG. 1c, in which the multiple layers of indirection include the mapping layer of FIG. 1c, the virtualization layer of FIG. 1e, and the physical layer of FIG. 1f.

The disclosed techniques for providing an efficient virtualization layer structure in a highly available data storage system will be further understood with reference to the following illustrative example, as well as FIGS. 1c-1g, 2, 3a, and 3b. In this example, the mapping layer 126 (see FIG. 1c), the virtualization layer 127 (see FIGS. 1c, 1e), and the physical layer 128 (see FIG. 1c, 1f) provide multiple layers of indirection for accessing host data (e.g., data blocks) in the data storage node 114. FIG. 1g depicts the multiple layers of indirection provided by the mapping layer 126, the virtualization layer 127, and the physical layer 128, with reference to the namespace layer 125 (see FIGS. 1c, 1d). As shown in FIG. 1g, the namespace layer 125 includes the LUN 130.0, which has a logical address 132.00, a logical address 132.01, a logical address 132.02, . . . , and so on, up to at least a logical address 132.0b associated therewith. It is noted that, like the LUN 130.0, each of the LUNs 130.1, . . . , 130.a, . . . in the namespace layer 125 has logical addresses associated therewith. For example, such logical addresses 132.00, 132.01, 132.02, . . . , 132.0b, . . . may correspond to contiguous offsets into the LUN 130.0. As further shown in FIG. 1g, the virtualization layer 127 has the VLB 134.0, which includes a virtual pointer 144.0, a virtual pointer 144.1, and so on, up to at least a virtual pointer 144.u. It is noted that, like the VLB 134.0, each of the VLBs 134.1, . . . , 134.p, . . . of the virtualization layer 127 includes multiple virtual pointers.

As shown in FIG. 1g, the mapping layer 126 includes a pointer array 140.0, a pointer array 140.1, a pointer array 140.2, and so on, up to at least a pointer array 140.r. The mapping layer 126 maps the logical addresses 132.00, 132.01, 132.02, . . . , 132.0b, . . . of the LUN 130.0 to the virtual pointers 144.0, 144.1, . . . , 144.u, . . . in the VLB 134.0. For example, the pointer arrays 140.0, 140.1, 140.2, . . . , 140.r, . . . may be arranged in a mapping hierarchy configured as a multi-level tree. Further, the lowest level of the multi-level tree may include an array of leaf pointers, such as one or more leaf pointers 142.0 in the pointer array 140.0, one or more leaf pointers 142.1 in the pointer array 140.1, one or more leaf pointers 142.2 in the pointer array 140.2, and so on, up to at least one or more leaf pointers 142.s in the pointer array 140.r. In the mapping of the logical addresses 132.00, 132.01, 132.02, . . . , 132.0b, . . . of the LUN 130.0 to the virtual pointers 144.0, 144.1, . . . , 144.0 in the VLB 134.0, each of the leaf pointer(s) 142.0, 142.1, 142.2, . . . , 142.s, . . . points to a respective one of the virtual pointers 144.0, 144.1, . . . , 144.0 . . . . In this example, the leaf pointer 142.0 points to the virtual pointer 144.0, the leaf pointer 142.1 also points to the virtual pointer 144.0, the leaf pointer 142.2 points to the virtual pointer 144.1, and so on, up to at least the leaf pointer 142.s, which points to the virtual pointer 144.u.

As shown in FIG. 1g, the physical layer 128 includes the PLB 136.0, which includes a data block 138.00, a data block 138.01, and so on, up to at least a data block 138.0v. It is noted that, like the PLB 136.0, each of the PLBs 136.1, . . . , 136.q, . . . in the physical layer 128 includes multiple data blocks, each of which can correspond to a compressed aggregate of blocks. Each of the virtual pointers 144.0, 144.1, . . . , 144.0 . . . in the VLB 134.0 includes tracking metadata (e.g., index, length) that support the individual addressing of the data blocks 138.00, 138.01, . . . , 138.0v, . . . in the PLB 136.0. The virtual pointer 144.0 includes an index 148.0 that indicates the position of data corresponding to each logical address 132.00, 132.01 in the data block 138.00 when decompressed. Likewise, the virtual pointer 144.1 includes an index 148.1 that indicates the position of data corresponding to the logical address 132.02 in the data block 138.01 when decompressed, and so on, up to at least the virtual pointer 144.u, which includes an index 148.0 that indicates the position of data corresponding to the logical address 132.0b in the data block 138.0v when decompressed. The virtual pointer 144.0 further includes a length 150.0 that indicates the total number of compressed blocks in the data block 138.00. Likewise, the virtual pointer 144.1 further includes a length 150.1 that indicates the total number of compressed blocks in the data block 138.01, and so on, up to at least the virtual pointer 144.u, which further includes a length 150.0 that indicates the total number of compressed blocks in the data block 138.0v.

As described herein, the virtualization layer 127 can provide block virtualization for purposes of supporting data deduplication. In this example, such block virtualization is exemplified by each of the logical addresses 132.00, 132.01 of the LUN 130.0 being mapped by the mapping layer 126 to the same virtual pointer 144.0 in the VLB 134.0, thereby indicating that the logical addresses 132.00, 132.01 correspond to duplicated data in the LUN 130.0. To support such data deduplication, the virtual pointer 144.0 further includes a hash value 146.0; which is a digest of the duplicated data corresponding to the logical addresses 132.00, 132.01. Likewise, the virtual pointer 144.1 further includes a hash value (or digest) 146.1 of the data corresponding to the logical address 132.02, and so on, up to at least the virtual pointer 144.u, which further includes a hash value (or digest) 146.1 of the data corresponding to the logical address 132.02. For example, the hash values 146.0, 146.1, . . . , 146.u, . . . may be generated using the SHA1 cryptographic hash function, or any other suitable hash function.

To further support data deduplication, the data storage node 114 generates, for each virtual pointer 144.0, 144.1, . . . , 144.u, . . . in the VLB 134.0, reference count metadata to keep track of the number of leaf pointers 142.0, 142.1, 142.2, . . . , 142.s in the pointer arrays 140.0, 140.1, 140.2, . . . , 140.r, respectively, that point to each virtual pointer 144.0, 144.1, . . . , 144.u, . . . . As shown in FIG. 1g, the two (2) leaf pointers 142.0, 142.1 each point to the virtual pointer 144.0, the single leaf pointer 142.2 points to the virtual pointer 144.1, and so on, up to at least the single leaf pointer 142.s, which points to the virtual pointer 144.u. Accordingly, the reference count metadata for the virtual pointer 144.0 includes a reference count equal to "2", the reference count metadata for the virtual pointer 144.1 includes a reference count equal to "1", and so on, up to at least the reference count metadata for the virtual pointer 144.u, which also includes a reference count equal to "1".

Figure 2:
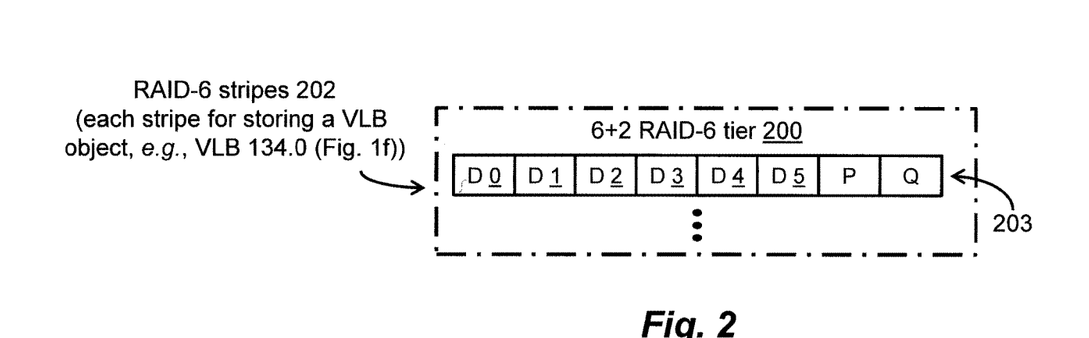
FIG. 2 is a block diagram of an exemplary RAID tier including multiple RAID stripes, in which each RAID stripe stores a respective virtual layer block (VLB) among an aggregation of VLBs of the virtualization layer of FIG. 1e.

In this example, to protect against possible data and/or metadata loss due to a physical drive failure, the data storage node 114 maintains each entire VLB of the virtualization layer 127 (including the hash value (or digest) and the tracking metadata (e.g., index, length)) in a respective RAID stripe of the RAID-6 tier 200 (see FIG. 2). In addition, the data storage node 114 maintains, in one or more metadata pages, the reference count metadata for the virtual pointers in the respective VLBs in the 3-way mirror RAID 300 (see FIG. 3a). The RAID-6 tier 200 and the 3-way mirror RAID 300 are each configured to protect against data and/or metadata loss due to the concurrent failure of two (2) physical drives.

FIG. 2 depicts an illustrative embodiment of the RAID-6 tier 200. As shown in FIG. 2, the RAID-6 tier 200 can include multiple RAID-6 stripes 202, each of which can store a VLB object corresponding to a respective VLB (e.g., the VLB 134.0; see FIGS. 1f, 1g) in the virtualization layer 127. In this example, the RAID layer 129 of the data storage node 114 can operate to configure the RAID-6 tier 200 as a 6+2 RAID-6 tier. To that end, the RAID-6 stripes 202 can be implemented at fixed locations across at least some of the physical drives 124.1, . . . , 124.k of the storage drive array 116 (see FIG. 1c). Further, each of the RAID-6 stripes 202 (such as a RAID-6 stripe 203) can be configured to include six (6) data blocks D0, D1, D2, D3, D4, D5 and two (2) parity blocks P, Q. For example, the size of each data block D0-D5 and the size of each parity block P, Q may be the same within the RAID-6 stripe 203 (e.g., 512 bytes). Further, a "P" parity value may correspond to a Reed-Solomon code generated using a "P" parity function, such as an XOR parity function or any other suitable parity function. Further, a "Q" parity value may correspond to a Reed-Solomon code generated using a "Q" parity function, such as $$Q = g^0 D_0 g^1 \cdot D^1 + g^2 \cdot D_2 + \ldots + g^{n-1} \cdot D_{n-1} \quad (1)$$

(in which "g" corresponds to any suitable generator polynomial, and the value of "D" corresponds to data stored in the data blocks D0-D5 of the associated RAID-6 stripe) or any other suitable parity function.

FIG. 3a depicts an illustrative embodiment of the 3-way mirror RAID 300. As shown in FIG. 3a, the 3-way mirror RAID 300 can include at least a primary drive 302.1, a secondary drive 302.2, and a tertiary drive 302.3 to provide 3-way mirroring of each metadata page (e.g., each 4 kilobyte (kb) page) containing reference count metadata for the virtual pointers in the respective VLBs 134.0, 134.1, . . . , 134.p, . . . of the virtualization layer 127. The 3-way mirror RAID 300 includes multiple physical drives, including, for example, at least three (3) different and distinct physical drives of the storage drive array 116. In this example, the primary drive 302.1 can correspond to the storage drive 124.1, the secondary drive 302.1 can correspond to the storage drive 124.2, and the tertiary drive 302.3 can correspond to the storage drive 124.3 of the storage drive array 116. Further, for a specific metadata page containing reference count metadata, a first instance of the metadata page is stored "in-place" on the primary drive 302.1, a second instance of the metadata page is stored in-place on the secondary drive 302.2, and a third instance of the metadata page is stored in-place on the tertiary drive 302.3, allowing each storage drive 302.1, 302.2, 302.3 to have a mirrored copy of the same metadata page.

As described herein, each of the VLBs 134.0, 134.1, . . . , 134.p, . . . in the virtualization layer 127 has an associated logical index, such as the logical index "0" for the VLB 134.0, the logical index "1" for the VLB 134.1, and so on, up to at least the logical index "p" for the VLB 134.p. Such logical indices 0, 1, . . . , p, . . . can be used by the RAID layer 129 of the data storage node 114 to organize the reference count metadata in one or more metadata pages for storage on the 3-way mirror RAID 300.

Figure 3B:
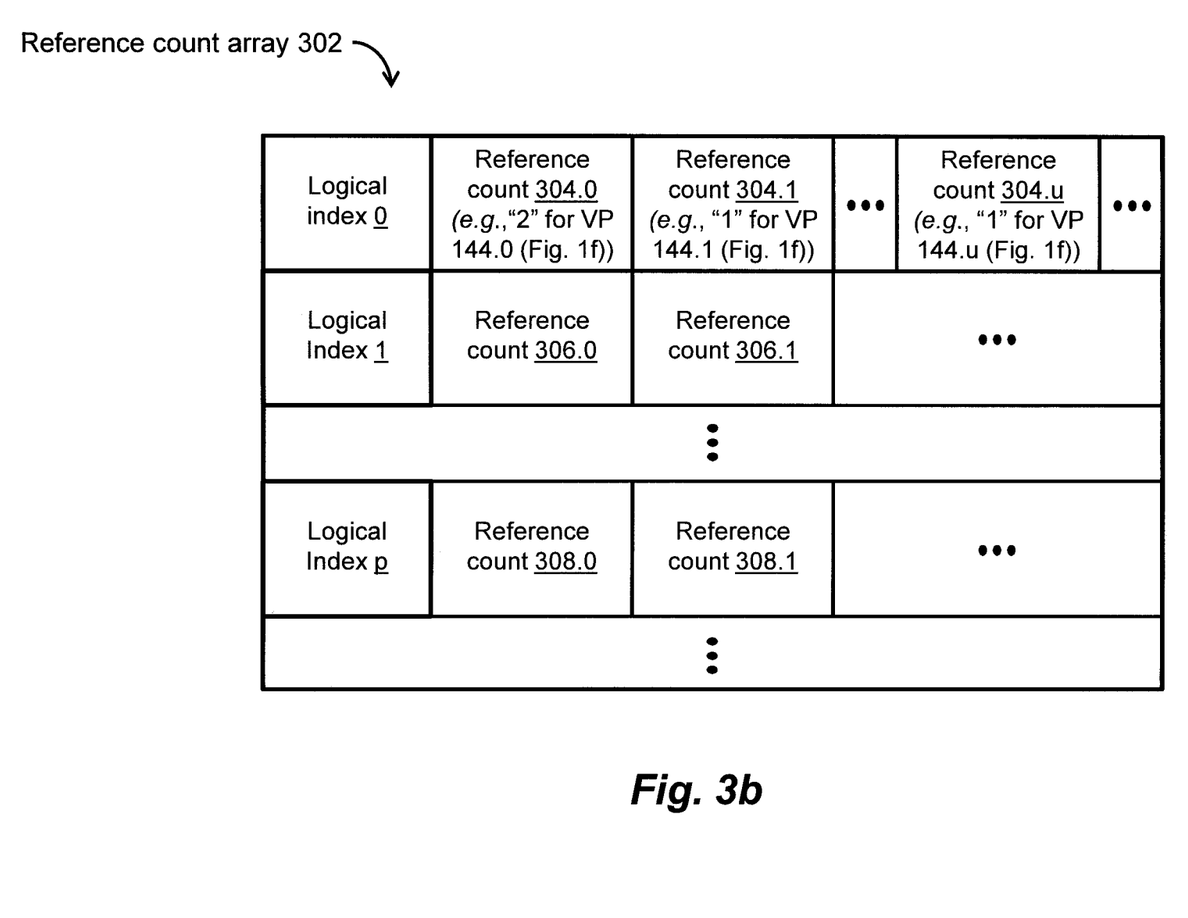

FIG. 3b depicts a reference count array 302, which is an exemplary organization of reference count metadata in a metadata page stored on the 3-way mirror RAID 300. As shown in FIG. 3b, the reference count array 302 includes a logical index "0", a logical index "1", and so on, up to at least a logical index "p". For example, the logical index "p" may have a value of up to one million (1,000,000) or more. The reference count array 302 further includes, for each logical index 0, 1, p, ..., the reference count metadata for the virtual pointers in a respective VLB 134.0, 134.1, ..., 134.p, .... In this example, the reference count array 302 includes, for the logical index 0, a reference count 304.0 having a value of "2" for the virtual pointer (VP) 144.0 in the VLB 134.0, a reference count 304.1 having a value of "1" for the virtual pointer (VP) 144.1 in the VLB 134.0, and so on, up to at least a reference count 304.0 having a value of "1" for the virtual pointer (VP) 144.0 in the VLB 134.0. Likewise, the reference count array 302 includes, for the logical index 1, a reference count 306.0 for a first virtual pointer in the VLB 134.1, a reference count 306.1 for a second virtual pointer in the VLB 134.1, and so on. Similarly, the reference count array 302 includes, for the logical index p, a reference count 308.0 for a first virtual pointer in the VLB 134.p, a reference count 308.1 for a second virtual pointer in the VLB 134.p, and so on. Accordingly, the reference count metadata in the metadata page organized as in the reference count array 302 can include many (e.g., up to several thousand or more) reference counts, allowing potentially many reference counts to be written (or updated) in a single metadata write (or update) operation. In addition, because the metadata page containing the reference count metadata is maintained in the 3-way mirror RAID 300 separate from the VLBs 134.0, 134.1, ..., 134.p, ... of the virtualization layer 127, each entire VLB can be maintained in a respective RAID stripe (such as the RAID-6 stripe 203; see FIG. 2) without requiring the journaling of updates to the reference counts.

Figure 4:
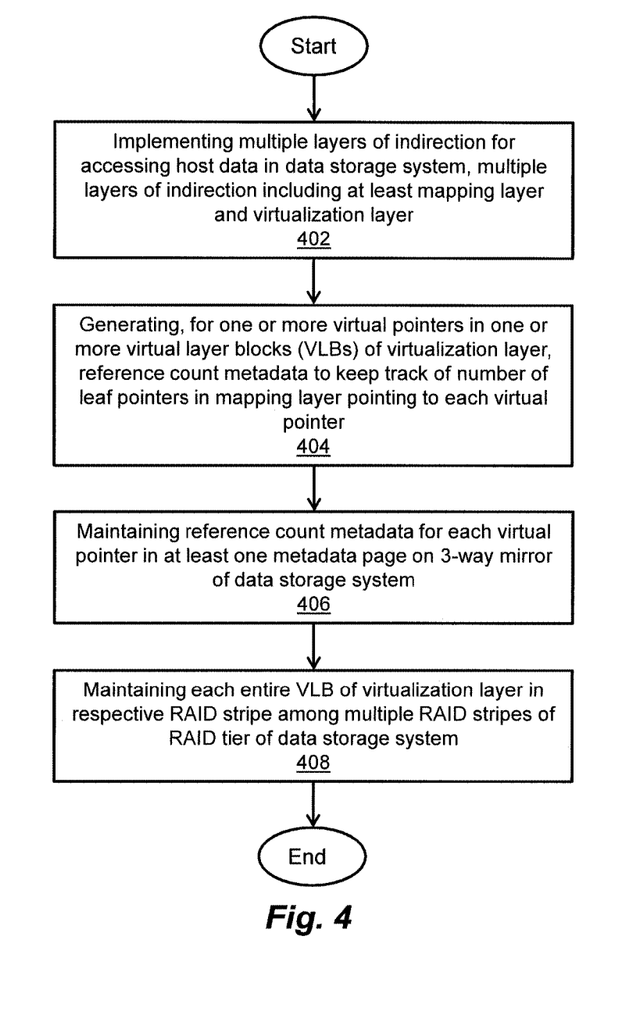
FIG. 4 is a flow diagram of an exemplary method of an efficient virtualization layer structure implemented in a highly available data storage system.

An exemplary method of an efficient virtualization layer structure implemented in a highly available data storage system is described below with reference to FIG. 4. As depicted in block 402, multiple layers of indirection are implemented for accessing host data in the data storage system, including at least a mapping layer and a virtualization layer. As depicted in block 404, for one or more virtual pointers in one or more virtual layer blocks (VLBs) of the virtualization layer, reference count metadata are generated to keep track of a number of leaf pointers in the mapping layer pointing to each virtual pointer. As depicted in block 406, the reference count metadata for each virtual pointer are maintained, in at least one metadata page, on a 3-way mirror of the data storage system. As depicted in block 408, each entire VLB of the virtualization layer is maintained in a respective RAID stripe among multiple RAID stripes of a RAID tier of the data storage system.

While various embodiments of the disclosure have been particularly shown and described, it will be understood by those skilled in the art that various changes in form and/or details may be made herein without departing from the scope of the disclosure, as defined by the appended claims.

What is claimed is:

1. A method of providing metadata protection in a data storage system, comprising:
   implementing multiple layers of indirection for accessing host data in the data storage system, the multiple layers of indirection including at least a mapping layer and a virtualization layer, the virtualization layer being disposed between the mapping layer and a physical layer of the data storage system, the physical layer storing an aggregation of physical layer blocks (PLBs), the virtualization layer including an aggregation of virtual layer blocks (VLBs), each VLB including a plurality of virtual pointers, each virtual pointer of the VLB pointing to a data block in a PLB from among the PLBs;
   generating deduplication metadata for the virtual pointer of the VLB, the deduplication metadata including a digest of the data block, tracking metadata for addressing the data block in the PLB, and reference count metadata to keep track of a number of leaf pointers in the mapping layer pointing to the virtual pointer;
   maintaining the digest and the tracking metadata in the virtual pointer of the VLB;
   maintaining, separate from the VLB that includes the virtual pointer, the reference count metadata for the virtual pointer in at least one metadata page on an N-way mirror RAID of the data storage system; and
   maintaining the entire VLB including the virtual pointer in a respective RAID stripe from among multiple RAID stripes of a RAID tier of the data storage system, each of the RAID tier and the N-way mirror RAID being configured to protect against loss of data and/or metadata maintained thereon due to concurrent failure of two physical drives.

2. The method of claim 1 further comprising:
   mapping, by the mapping layer, one or more logical addresses of one or more logical units to the one or more virtual pointers in the one or more VLBs, the digest of the data block corresponding to a respective logical address from among the one or more logical addresses mapped to the virtual pointer of the VLB.

3. The method of claim 1 wherein the N-way mirror RAID is a 3-way mirror RAID, wherein the 3-way mirror RAID includes at least a primary drive, a secondary drive, and a tertiary drive of the data storage system, and wherein the maintaining of the reference count metadata for the virtual pointer in at least one metadata page includes (i) storing a first instance of each metadata page in-place on the primary drive, (ii) storing a second instance of each metadata page in-place on the secondary drive, and (iii) storing a third instance of each metadata page in-place on the tertiary drive.

4. The method of claim 3 wherein the reference count metadata includes a reference count corresponding to the number of leaf pointers pointing to the virtual pointer of the VLB, wherein the VLB has a logical index associated therewith, and wherein the maintaining of the reference count metadata for the virtual pointer in at least one metadata page further includes maintaining, in a respective metadata page for the logical index of the VLB, the reference count corresponding to the number of leaf pointers pointing to the virtual pointer of the VLB.

5. The method of claim 3 wherein the maintaining of the entire VLB including the virtual pointer in a respective RAID stripe includes maintaining the entire VLB in a respective RAID stripe of a RAID-6 tier of the data storage system.

6. The method of claim 5 wherein the maintaining of the entire VLB including the virtual pointer in a respective RAID stripe includes maintaining the entire VLB in the respective RAID stripe of a 6+2 RAID-6 tier of the data storage system.

7. The method of claim 1 wherein the data storage system includes a plurality of physical drives, and wherein the maintaining of the entire VLB including the virtual pointer in a respective RAID stripe includes maintaining the entire VLB in a respective RAID stripe at a fixed location across at least some of the plurality of physical drives.

8. A system for providing metadata protection in a data storage system, comprising:
a memory; and
storage processing circuitry configured to execute program instructions out of the memory:
to implement multiple layers of indirection for accessing host data in the data storage system, the multiple layers of indirection including at least a mapping layer and a virtualization layer, the virtualization layer being disposed between the mapping layer and a physical layer of the data storage system, the physical layer storing an aggregation of physical layer blocks (PLBs), the virtualization layer including an aggregation of virtual layer blocks (VLBs), each VLB including a plurality of virtual pointers, each virtual pointer of the VLB pointing to a data block in a PLB from among the PLBs;
to generate deduplication metadata for the virtual pointer of the VLB, the deduplication metadata including a digest of the data block, tracking metadata for addressing the data block in the PLB, and reference count metadata to keep track of a number of leaf pointers in the mapping layer pointing to the virtual pointer;
to maintain the digest and the tracking metadata in the virtual pointer of the VLB;
to maintain, separate from the VLB that includes the virtual pointer, the reference count metadata for the virtual pointer in at least one metadata page on an N-way mirror RAID of the data storage system; and
to maintain the entire VLB including the virtual pointer in a respective RAID stripe from among multiple RAID stripes of a RAID tier of the data storage system, each of the RAID tier and the N-way mirror RAID being configured to protect against loss of data and/or metadata maintained thereon due to concurrent failure of two physical drives.

9. The system of claim 8 wherein the storage processing circuitry is further configured to execute the program instructions out of the memory:
to map, by the mapping layer, one or more logical addresses of one or more logical units to the one or more virtual pointers in the one or more VLBs, and the digest of the data block corresponding to a respective logical address from among the one or more logical addresses mapped to the virtual pointer of the VLB.

10. The system of claim 8 wherein the N-way mirror RAID is a 3-way mirror RAID, wherein the 3-way mirror RAID includes at least a primary drive, a secondary drive, and a tertiary drive of the data storage system, and wherein the storage processing circuitry is further configured to execute the program instructions out of the memory (i) to store a first instance of each metadata page in-place on the primary drive, (ii) to store a second instance of each metadata page in-place on the secondary drive, and (iii) to store a third instance of each metadata page in-place on the tertiary drive.

11. The system of claim 10 wherein the reference count metadata includes a reference count corresponding to the number of leaf pointers pointing to the virtual pointer of the VLB, wherein the VLB has a logical index associated therewith, and wherein the storage processing circuitry is further configured to execute the program instructions out of the memory to maintain, in a respective metadata page for the logical index of the VLB, the reference count corresponding to the number of leaf pointers pointing to the virtual pointer of the VLB.

12. The system of claim 10 wherein the storage processing circuitry is further configured to execute the program instructions out of the memory to maintain the entire VLB in a respective RAID stripe of a RAID-6 tier of the data storage system.

13. The system of claim 12 wherein the storage processing circuitry is further configured to execute the program instructions out of the memory to maintain the entire VLB in the respective RAID stripe of a 6+2 RAID-6 tier of the data storage system.

14. The system of claim 8 wherein the data storage system includes a plurality of physical drives, and wherein the storage processing circuitry is further configured to execute the program instructions out of the memory to maintain the entire VLB in a respective RAID stripe at a fixed location across at least some of the plurality of physical drives.

15. A computer program product including a set of non-transitory, computer-readable media having instructions that, when executed by control circuitry of a computerized apparatus, cause the control circuitry to perform a method of providing metadata protection in a data storage system, the method comprising:
implementing multiple layers of indirection for accessing host data in the data storage system, the multiple layers of indirection including at least a mapping layer and a virtualization layer, the virtualization layer being disposed between the mapping layer and a physical layer of the data storage system, the physical layer storing an aggregation of physical layer blocks (PLBs), the virtualization layer including an aggregation of virtual layer blocks (VLBs), each VLB including a plurality of virtual pointers, each virtual pointer of the VLB pointing to a data block in a PLB from among the PLBs;
generating deduplication metadata for the virtual pointer of the VLB, the deduplication metadata including a digest of the data block, tracking metadata for addressing the data block in the PLB, and reference count metadata to keep track of a number of leaf pointers in the mapping layer pointing to the virtual pointer;
maintaining the digest and the tracking metadata in the virtual pointer of the VLB;
maintaining, separate from the VLB that includes the virtual pointer, the reference count metadata for the virtual pointer in at least one metadata page on an N-way mirror RAID of the data storage system; and
maintaining the entire VLB including the virtual pointer in a respective RAID stripe from among multiple RAID stripes of a RAID tier of the data storage system, each of the RAID tier and the N-way mirror RAID being configured to protect against loss of data and/or metadata maintained thereon due to concurrent failure of two physical drives.

16. The computer program product of claim 15 wherein the method further comprises:
mapping, by the mapping layer, one or more logical addresses of one or more logical units to the one or more virtual pointers in the one or more VLBs, the digest of the data block corresponding to a respective logical address from among the one or more logical addresses mapped to the virtual pointer of the VLB.

17. The computer program product of claim 15 wherein the N-way mirror RAID is a 3-way mirror RAID, wherein the 3-way mirror RAID includes at least a primary drive, a secondary drive, and a tertiary drive of the data storage system, and wherein the maintaining of the reference count metadata for the virtual pointer in at least one metadata page includes (i) storing a first instance of each metadata page in-place on the primary drive, (ii) storing a second instance of each metadata page in-place on the secondary drive, and (iii) storing a third instance of each metadata page in-place on the tertiary drive.

18. The computer program product of claim 17 wherein the data storage system includes a plurality of physical drives, and wherein the maintaining of the entire VLB including the virtual pointer in a respective RAID stripe includes maintaining the entire VLB in a respective RAID-6 stripe of a 6+2 RAID-6 tier at a fixed location across at least some of the plurality of physical drives.

* * * * *